No. 617,726. Patented Jan. 17, 1899.
S. EVERSHED.
COUNTING MECHANISM OF ELECTRIC SUPPLY MOTOR METERS.
(Application filed June 7, 1898.)
(No Model.) 2 Sheets—Sheet 1.

Witnesses:

Inventor:
Sydney Evershed
By Richardson
his Attorneys

No. 617,726. Patented Jan. 17, 1899.
S. EVERSHED.
COUNTING MECHANISM OF ELECTRIC SUPPLY MOTOR METERS.
(Application filed June 7, 1898.)
(No Model.) 2 Sheets—Sheet 2.
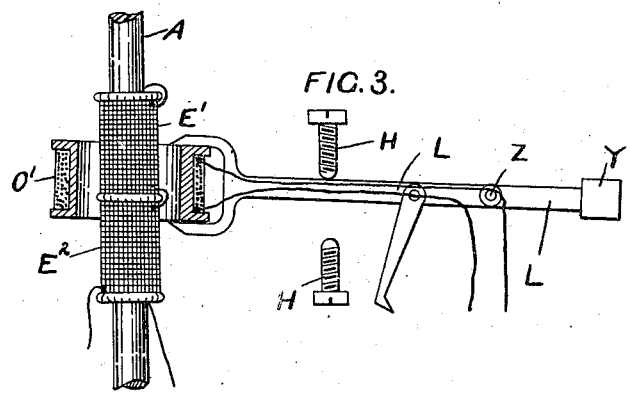
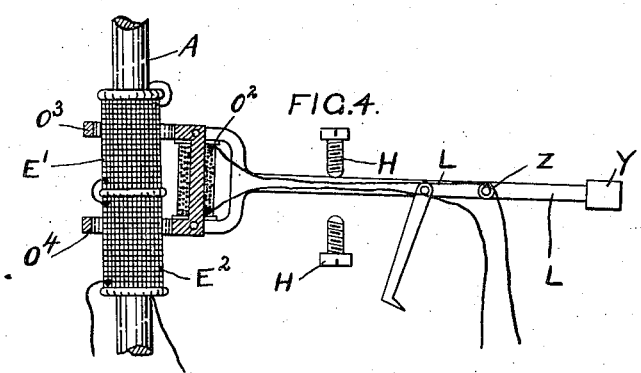
Witnesses:
Inventor:
Sydney Evershed
By Richardson
his Attorneys

UNITED STATES PATENT OFFICE.

SYDNEY EVERSHED, OF LONDON, ENGLAND.

COUNTING MECHANISM OF ELECTRIC-SUPPLY MOTOR-METERS.

SPECIFICATION forming part of Letters Patent No. 617,726, dated January 17, 1899.

Original application filed December 21, 1897, Serial No. 662,927. Divided and this application filed June 7, 1898. Serial No. 682,834. (No model.)

*To all whom it may concern:*

Be it known that I, SYDNEY EVERSHED, a subject of Her Britannic Majesty, residing at London, England, have invented Improvements in Counting Mechanism of Electric-Supply Motor-Meters, of which the following is a specification, reference being had to the accompanying drawings, and for which I have secured Letters Patent in France under date of May 26, 1898, No. 275,004.

This application is a division of my former application filed December 21, 1897, Serial No. 662,927.

This invention relates to the counting mechanism of electric-supply motor-meters; and it consists of an electrical driving device for the counting-trains of such meters, whereby the electrical operation of such counting-trains is effected without retardation to the rotation of the spindle of such meter, which is of the utmost importance in affording extreme accuracy to the records of such meters.

In this specification the term "motor-meter" is used to signify any electric-supply meter in which an electric motor is employed to measure directly or indirectly the quantity of electric energy or quantity of electricity supplied.

The term "counting-train" is used to signify any counting mechanism, such as is commonly used to indicate the quantities measured by a meter.

Figure 2:
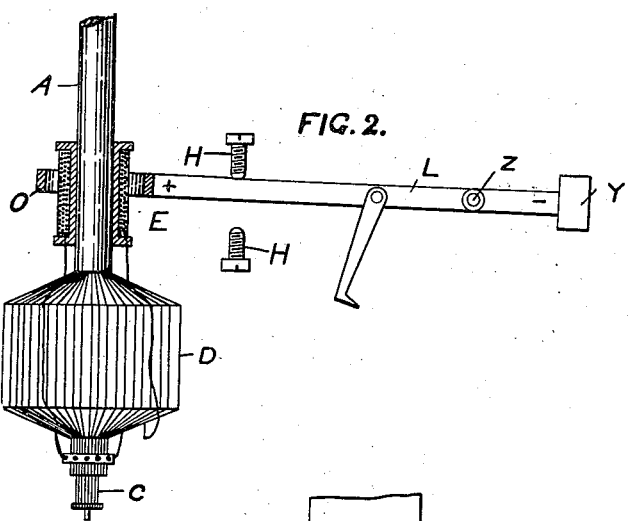
Figure 1:
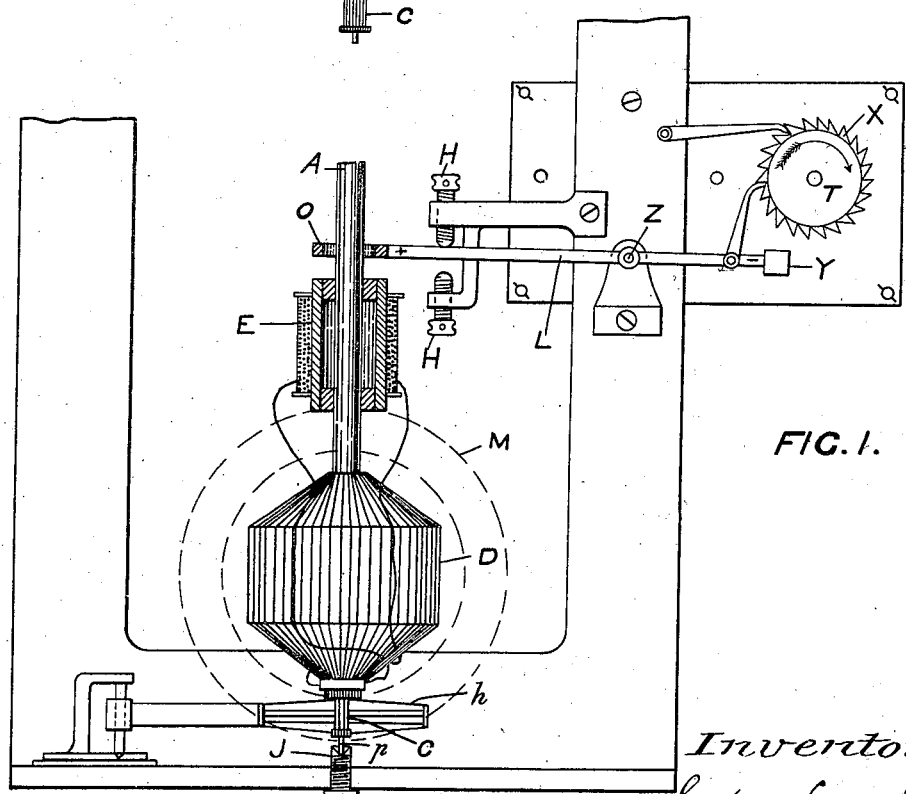

Figure 1 shows in elevation an electrical driving device adapted to an electrical meter-spindle having a commutator and brushes for commutating the current passing through the armature. Fig. 2 shows an equivalent modification of Fig. 1, in which the ring-pole of the reciprocating driving-lever surrounds the electromagnet on the meter-spindle. Figs. 3 and 4 show equivalent modifications of my electrical driving device adapted to meters operating with alternate currents.

In this invention there is no mechanical connection between the motor and the train, the latter being driven by any device adapted to be operated by an electromagnet, the circuit of which is closed and broken or alternately reversed by a rotary contact-maker or commutator fixed on the meter-spindle. The magnet-circuit being closed or reversed once or more frequently in each revolution of the meter-spindle, a balanced armature-lever to the said electromagnet is thus adapted to drive an ordinary counting-train without contact with or retardation to the rotation of the meter-spindle. Where a commutator is used for the motor-meter, any extra friction due to the rotary contact is eliminated by adapting the commutator-brushes to alternately reverse or make and break the circuit of the train-operative electromagnet.

A is the spindle of any motor-meter, and D is the usual armature thereon, C being the commutator thereon and *h* one of the brushes.

In the arrangement in Fig. 1 the reciprocating lever L, pivoted at Z and with a counterbalance-weight Y, is made of magnetized steel having one pole O in the form of a ring around the meter-axle, but not touching it. Immediately beneath the ring O an electromagnet having a cylindrical core E is fixed to (and concentric with) the axle A. The coil of this electromagnet is connected in series, either with one of the coils in the armature or with the connecting-wires between an armature-coil and the commutator. In the first case half the total current in the armature-circuit traverses the electromagnet and reverses twice in each revolution. In the second case the whole of the armature-current traverses the electromagnet during the time the particular section of the commutator with which it is in series is under the brush, the current in this case also being first in one direction and then in the other. The successive reversals of the polarity of the electromagnet cause the lever L to reciprocate between the stops H and drive by a pawl the ratchet-wheel X, attached to the train. The lever L is balanced by means of a weight Y. This device may be modified in many ways. For example, the electromagnet may have two separate windings, each connected in series with one armature-coil, the coils selected for this purpose being of course two corresponding coils in the two halves of the drum-winding of the armature.

In another modification the lever L may be made of soft iron and simply acts as the keeper of the electromagnet. In this case the weight Y is arranged to bring the lever against the upper stop H, since the electromagnet will attract the ring-pole of the lever every time the current traverses its coils without regard to its direction. The coil of the electromagnet must in this modification be connected in series with the wire joining one of the armature-coils to the commutator. It will be readily understood that in this case the lever will make two strokes to each revolution of the axle A.

In Fig. 2 I show an equivalent arrangement of train and driving magnet when the meter is intended to be used with direct currents. The lever L is either of magnetized steel or may be made of soft iron magnetized by induction drawn from fixed magnets or separately magnetized by means of a coil. The ring-pole O embraces an electromagnet E, formed by winding a coil direct on the axle, so that the latter forms the core of the electromagnet. The successive reversals of the current in the electromagnet cause the ring-pole O to be attracted alternately upward and downward, the motion being, as before, limited by stops H H.

In Fig. 3 is shown a modification more particularly adapted for use with alternate currents. In this the core of the electromagnet is formed by the axle A, and its coils are wound in two sections $E'$ and $E^2$, coupled together in such a manner as to produce a consequent pole at their adjacent ends. An iron disk may be fixed on the axle between the two adjacent ends of the coils to increase the magnetic induction proceeding from the pole. The windings of the electromagnets are connected to the armature in one or other of the ways already described with this modification. The lever L is formed of non-magnetic material and carries at one end a coil O, which may conveniently form part of the resistance in series with the motor-armature, the current being led to the coil by means of flexible connections. The successive reversals of polarity of the central pole of the electromagnet drive the coil O up and down, driving the train in the manner already described.

Fig. 4 is a modification of Fig. 3, the coil O' being replaced by an electromagnet $O^2$, having a soft-iron core, with ring-poles $O^3$ and $O^4$ at either end. The necessary force for moving the lever L is in this case due to the magnetic induction from the poles $O^3$ and $O^4$ passing through the winding $E'$ and $E^2$ of the electromagnet on the axle A. The current for the exciting-coil of the electromagnet on the lever is obtained in the manner described in connection with Fig. 3.

It is to be clearly understood that the only essential condition for the successful working of this electromagnetic train-driving device is that the mechanical force due to the electromagnet should act in the direction of the axis of rotation of the axle, so that there is no mechanical force which may have a component to produce a turning moment in the axle.

The various modifications of the device which I have described and shown in the drawings are those which I have found well adapted for the purpose; but I may adopt other modifications in which the above essential condition is fulfilled.

Having now described my invention, what I claim, and desire to secure by Letters Patent, is—

1. In a motor-meter, the combination with an armature-axle of an electromagnet thereon, excited intermittently by a current derived from the armature, a balanced lever pivoted to lie in mid-stroke at right angles to the said axle, having a magnetic head surrounding the said axle, adjacent to the electromagnet thereon but not touching it and adapted to reciprocate in the direction of the axis of rotation without retardation to the said axle synchronously with the pulsations of the said current, and means on said balanced rocking lever to actuate a counting-train, substantially as described.

2. In a motor-meter, the combination with an armature-axle, of two sectional electromagnetic coils thereon with a consequent pole at adjacent ends, excited by an alternate current derived from the armature, a balanced lever of non-magnetic material pivoted to lie in mid-stroke at right angles to the said axle having a soft-iron head adapted to surround both the said axle and coils thereon but without contact therewith, a subsidiary coil upon said head of balanced lever energized by the alternating current from the armature, all adapted to effect reciprocation of the balanced lever without retardation to the axle, and means on said balanced lever to actuate a counting-train, substantially as described.

In witness whereof I have hereunto set my hand in presence of two witnesses.

SYDNEY EVERSHED.

Witnesses:
RICHARD A. HOFFMANN,
CHARLES CARTER.